United States Patent
Behera et al.

(10) Patent No.: US 12,340,204 B2
(45) Date of Patent: Jun. 24, 2025

(54) LAUNCHING COPIES OF INSTALLATION SOFTWARE THAT ROLLS BACK AGENT UPDATES WHEN CLUSTER UPDATES FAIL

(71) Applicant: Dell Products L.P., Round Rock, TX (US)

(72) Inventors: Amarendra Behera, Bangalore (IN); Shelesh Chopra, Bangalore (IN); Jayashree Radha, Bangalore (IN); Ken Owens, Burlington (CA)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 18/174,085

(22) Filed: Feb. 24, 2023

(65) Prior Publication Data
US 2024/0289229 A1 Aug. 29, 2024

(51) Int. Cl.
| | | |
|---|---|---|
| *G06F 8/65* | (2018.01) | |
| *G06F 8/61* | (2018.01) | |
| *G06F 11/14* | (2006.01) | |

(52) U.S. Cl.
CPC .................. *G06F 8/65* (2013.01); *G06F 8/61* (2013.01); *G06F 11/1433* (2013.01); *G06F 2201/865* (2013.01)

(58) Field of Classification Search
CPC .... G06F 11/1433; G06F 11/1469; G06F 8/65; G06F 2201/84
See application file for complete search history.

(56) References Cited

U.S. PATENT DOCUMENTS

| | | | | |
|---|---|---|---|---|
| 2010/0262558 A1* | 10/2010 | Edwards | .............. | G06Q 10/067 705/348 |
| 2010/0318986 A1* | 12/2010 | Burke | ..................... | G06F 21/16 709/224 |
| 2013/0139139 A1* | 5/2013 | Mallur | ...................... | G06F 8/65 717/170 |
| 2016/0092196 A1* | 3/2016 | Kuchibhotla | ............. | G06F 8/65 717/170 |
| 2020/0042301 A1* | 2/2020 | Willis | ....................... | G06F 8/65 |
| 2021/0019135 A1* | 1/2021 | Hwang | ................. | G06F 9/4881 |

(Continued)

*Primary Examiner* — Qing Chen
(74) *Attorney, Agent, or Firm* — Dergosits & Noah LLP; Todd A. Noah

(57) ABSTRACT

System enables selection of application hosts which meet update requirements, then downloads update for instances of application agent corresponding to selected application hosts. System puts selected application hosts in maintenance mode, which prevents selected application hosts from beginning execution of any operations, until updating selected application hosts is completed. System creates copy of instructions, which when executed, installs update in instance of application agent in one of application hosts, and reports on update process to server which communicates with application hosts. System launches worker process from copy of instructions. System initiates update sessions which install update in instances of application agent corresponding to selected application hosts. If update sessions failed to install update in any of instances of application agent in cluster of application hosts, system rolls back update for updated instances of application agents in cluster of application hosts to previous conditions of instances of application agents.

20 Claims, 3 Drawing Sheets

(56) References Cited

U.S. PATENT DOCUMENTS

| | | | |
|---|---|---|---|
| 2023/0120785 A1* | 4/2023 | Kaimal | H04L 67/34 718/1 |
| 2024/0289228 A1* | 8/2024 | Owens | G06F 11/1469 |

* cited by examiner

LAUNCHING COPIES OF INSTALLATION SOFTWARE THAT ROLLS BACK AGENT UPDATES WHEN CLUSTER UPDATES FAIL

BACKGROUND

A data object can be a set of information that is backed up as a unit. If a software error corrupts a data object, or if erroneous data updates the data object, a data protection administrator may restore the data object to a previous state that does not include the corrupted or erroneous data. A backup and restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup and restore application to execute a restore operation to restore a copy of the corresponding backup file(s) for that state to the data object.

A data object may be stored on a storage array, which can be a disk-based retention system that includes multiple disk drives. Unlike a disk enclosure, a storage array has cache memory and advanced functionality, such as virtualization and Redundant Array of Independent Disks. A data protection administrator can instruct a backup and restore application to create backups files of data objects and store the backup files of data objects on multiple storage arrays.

A data center may have several networked computers, or hosts, that execute software applications, such as the applications which are provided by Oracle, SQL, SAP HANA, Exchange, and/or File system. A backup and restore application can execute on a backup server and provide application agents which can protect data for these types of software applications which execute on application hosts. For example, a backup and restore application provides an Oracle agent that is installed on application hosts which execute instances of an Oracle application, and that protects the data for each of the instances of the Oracle application.

A backup and restore application can have many different application agents, and an application host needs to securely download an application agent software package to use during the update of the application agent's host. If these application agent software packages are corrupted by malicious software, the update process could install malicious software on the application host. Application hosts can have many application agents that require updates from time to time, and manually updating each application agent could take hours.

If a backup and restore application offers an application agent for a software application, a system administrator can manually log into one of the application hosts that is capable of executing the application, download a software package which includes the application agent, and install the software package on the application host. After the backup and restore application provides an update for an application agent that protects data for an application, a system administrator can manually log into one of the application hosts that executes the application, download a software package which includes the update for the application agent, and install the update from the software package on the application agent in the application host.

DETAILED DESCRIPTION

Figure 1:
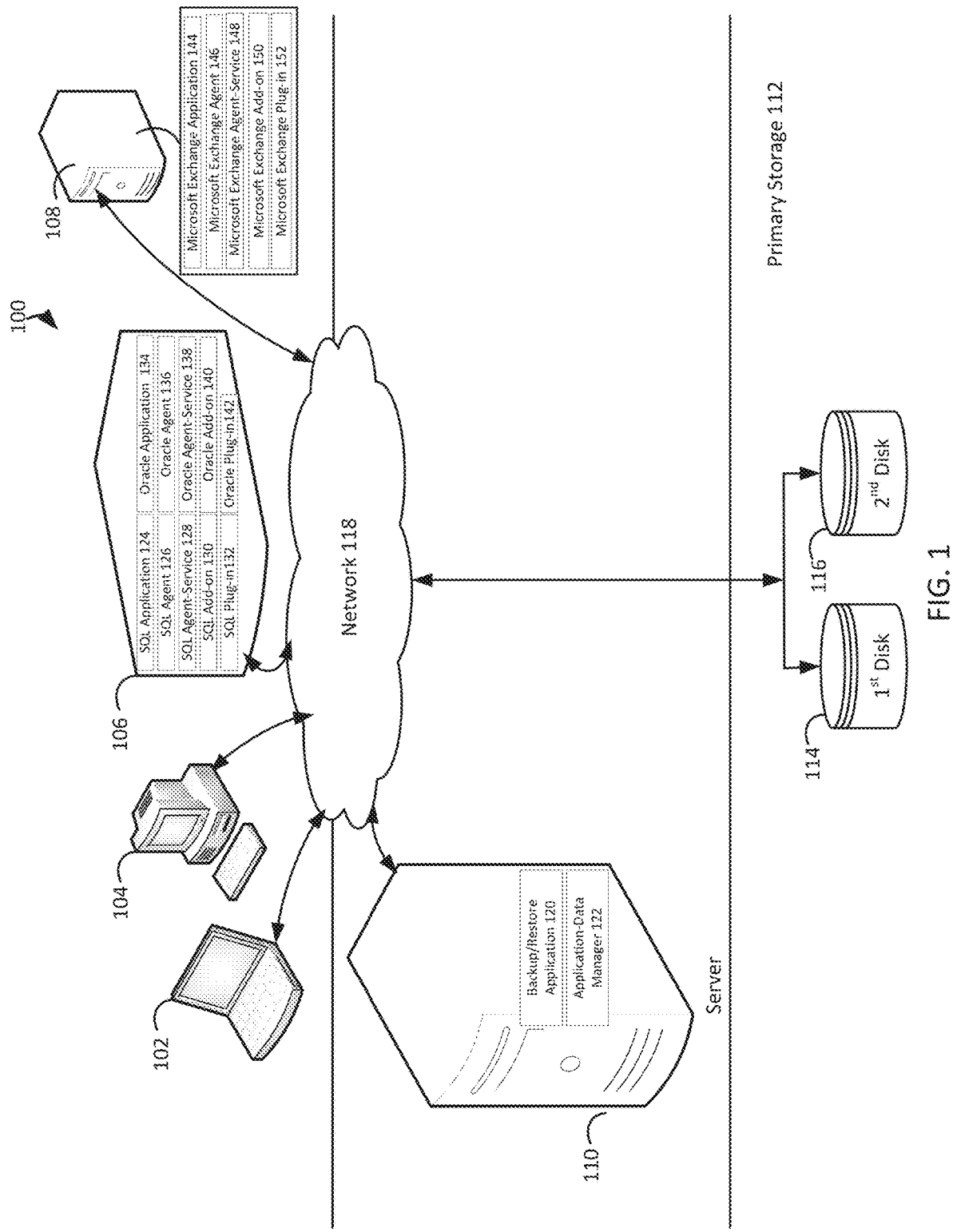
FIG. 1 illustrates a block diagram of an example system for launching copies of installation software that rolls back agent updates when cluster updates fail, under an embodiment.

If an error occurs during a session for updating an application agent in a cluster of application hosts, the error may leave the cluster of application hosts in an unusable state. Ideally the application agents in a cluster of application hosts would be rolled back to the state that the application agents were in before the update of the application agents was first attempted. However, application agents and agent services use a hybrid approach to installing updates. Some aspects of the update installation are executed by operating system packages, while other aspects of the update installation are executed by shell scripts or binary code. The operating system packages offer some level of rollback capability, with the amount varying between operating systems vendors, but the shell scripts and binary code used for installing updates provide no rollback capabilities at all.

During the installation of an update of an application agent, some application agents have configuration files which are subsequently changed or otherwise updated. Therefore, if an update fails for an application agent, and the application agent needs to be rolled back to the previous version of the application agent, then an application data manager may not be able to roll back the application agent to the previous version of the application agent. Consequently, an application agent's changed configuration files may not function properly with the original version of the application host's software. Complicating the installation of updates, updating an application host involves several different components, each of these components has its own files, and there is no standard naming convention or location for these components' files. Additionally, automated update solutions rely on operating system installers, but if the update of an application agent fails, then the operating system installers do not restore the original configuration of the application agent that they update.

When a software package automatically updates itself, the software package may shut itself down during the process of updating itself, such that the software package needs another entity to continue the updating process and to report on the updating process. When the updating software package uses an operating system package, such as Windows MSI or Linux RPM, to continue and report on the updating process, the operating system package updates all the binary code in the software package. When the update is being performed using a binary code that is in the old version of the software package, and the update process removes and replaces the old version of the binary code, overwriting the binary code during the update process can cause the update process to stop or malfunction. Some software packages address this over-writing problem by launching an operating system installer on a remote host and then exiting. However, if the operating system installer fails, then the updating server loses the ability to communicate with the remote host.

A backup and restore application, such as Dell Technologies' PowerProtect Data Manager, supports different cluster types, such as AAG, FCI, DAG, Multi Node, etc., across different asset types. When a system administrator selects specific application agents in a cluster of application hosts to update but does not select to update all application agents in the cluster of application hosts, this selection could leave the cluster of application hosts in an inconsistent state. When some application hosts in a cluster of application hosts are executing a higher version of an application than other application hosts in the same cluster are executing, the end-to-end backup and restore application agent's operations may not function correctly.

A system administrator can periodically analyze a data center to determine whether any application hosts need to be replaced or removed. If an application host which needs to be removed is currently being protected by a backup and restore application, then the backup and restore application needs to decommission the application host. Therefore, a system administrator can also execute commands in the application host that unregister the application agent from the backup and restore application, and manually decommission the application host from the backup and restore application.

Decommissioning an application host typically involves unregistering the application host, deleting the catalog entries of assets in the application host, and executing commands in the backup and restore application to manually delete the assets and the states of the application host from the backup and restore application. In some cases, a system technician may have already disconnected an application host from the data center by turning the power off the application host, but if the backup and restore application does not have any record of the disconnection, the backup and restore application might schedules tasks which the application host keeps failing to accomplish, such that the system administrator sees significantly large numbers of failures for tasks scheduled by the backup and restore application, which is annoying and confusing. In some cases, deleting a catalog's entries for an application host is not possible because the application host is no longer reachable due to a previous disconnection. If this application host is subsequently re-registered with the backup and restore application at a later point in time, the old catalog entries can remain in the application host, which can cause significant confusion. Since data centers typically include relatively large numbers of application hosts, managing the life cycle for each individual application agent logging in to an application host, downloading, installing, and updating application agents, and registering, and unregistering an application host can become very laborious and error-prone.

Embodiments herein provide a system for launching copies of installation software that rolls back agent updates when cluster updates fail. A system enables selection of application hosts which meet update requirements, then downloads an update for instances of an application agent corresponding to a selected application host. The system puts selected application hosts in a maintenance mode, which prevents selected application hosts from beginning execution of any operations, until updating selected application hosts is completed. The system creates a copy of instructions, which when executed, installs the update in an instance of an application agent in one of the application hosts, and reports on the update process to a server which communicates with the application hosts. The system launches a worker process from a copy of instructions. The system initiates update sessions which install an update in instances of the application agent corresponding to selected application hosts. If any update sessions failed to install an update in any of the instances of the application agent in the cluster of application hosts, the system rolls back the update for updated instances of application agents in a cluster of application hosts to previous conditions of instances of application agents.

For example, since the system administrator selected to update the application host, the system downloads updates, which include the update for the version 19.12 of the SQL agent for the SQL application in the application host, and the update for the version 19.12 of the Oracle agent for the Oracle application in the application host. The system puts multiple application hosts, including the selected application host, in maintenance mode, which enables the application hosts to install updates. Before an update process begins, the application agent's service package makes a copy of its source files on the application host's hard drive, then launches a worker process from those source files. These source files' binary code is a full-fledged application agent's service package that can install an update and continue reporting on the update process to the central server which communicates with the application hosts. The system initiates update sessions that install updates, such as updates to the instances of the SQL agent and updates to the instances of the Oracle agent, which modify these agents from their previous version number 19.11 to the most recent version number 19.12 that is available. The system determines whether all the update sessions succeeded in installing an update in all of their intended application agents which are in their application hosts, including the updates to the SQL agent and the Oracle agent in a cluster of the application hosts. Since the application data manager fails to install the update in the Oracle agent, the system rolls back updates to successfully updated application agents, including the update in the SQL agent. By copying the source files for an application agent's service package to an application host's hard drive, and launching a worker process from those source files, an application agent's service package can install an update and continue reporting on the update process to the central server which communicates with the application hosts.

FIG. 1 illustrates a diagram of a system 100 for launching copies of installation software that rolls back agent updates when cluster updates fail, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108; and a server 110, and a primary storage 112 that may be provided by a hosting company. Although FIG. 1 depicts the first client 102 as a laptop computer 102, the second client 104 as a personal computer 104, the third client 106 as an application host 106, and the fourth client 108 as a server 108, each of the clients 102-108 may be any type of computer. The primary storage 112 includes a first disk 114 and a second disk 116.

The clients 102-108, the server 110, and the primary storage 112 communicate via a network 118. Although FIG. 1 depicts the system 100 with four clients 102-108, one server 110, one primary storage 112, two disks 114-116, and one network 118, the system 100 may include any number of clients 102-108, any number of servers 110, any number of primary storage 112, any number of disks 114-116, and any number of networks 118. The clients 102-108 and the server 110 may each be substantially similar to the system 300 depicted in FIG. 3 and described below.

The server 110, which may be referred to as a backup server 110, includes a backup and restore application 120 that can create backup files of data objects for the clients 102-108, and execute a restore based on the backup files stored on the primary storage 112. The backup and restore application 120 can provide centralized administration, such as scheduling, monitoring, and managing backup operations and backup files. The backup and restore application 120 can enable the storing of backup operation schedules, client policies, and client configurations. The backup and restore application 120 can provide a unique interface to the clients 102-108 during login and also assist the backup server 110 in authenticating and registering the clients 102-108.

The backup and restore application 120 can send backup and restore work orders to the clients 102-108, which can receive and process the work orders to start a backup or restore operation. The backup and restore application 120 can maintain a local database of all processes that execute on the backup server 110. The backup and restore application 120 can execute server-side processes for a system administrator's graphical management console, which may enable the system administrator to use command line interface tools for queries. For example, a system administrator identifies the clients 102-108 registered with the backup server 110.

The backup and restore application 120 can use an application data manager 122 to check whether application hosts meet update requirements, put these application hosts into maintenance mode, and perform the update of application agents in application hosts. FIG. 1 depicts the backup and restore application 120 and the application data manager 122 residing completely on the backup server 110, but the backup and restore application 120 and/or the application data manager 122 may reside in any combination of partially on the backup server 110, partially on another server which is not depicted in FIG. 1, and partially on the clients 102-108.

The application host 106 executes a SQL application 124, which is bundled with an agent software stack that includes a SQL agent 126, a SQL agent-service 128, a SQL Add-on 130, and a SQL Plug-in 132 provided by the backup and restore application 120. The application host 106 also executes an Oracle application 134, which is bundled with an agent software stack that includes an Oracle agent 136, an Oracle agent-service 138, an Oracle Add-on 140, and an Oracle Plug-in 142 provided by the backup and restore application 120. The server 108 executes a Microsoft Exchange application 144, which is bundled with an agent software stack that includes a Microsoft Exchange agent 146, a Microsoft Exchange agent-service 148, a Microsoft Exchange Add-on 150, and a Microsoft Exchange Plug-in 152 provided by the backup and restore application 120.

The backup and restore application 120, such as Dell Technologies' PowerProtect Data Manager, executes on the backup server 110, such as Dell Technologies' Data Domain server, while new versions of the backup and restore application 120 can provide new versions of the corresponding application agents and the corresponding updates to application agents. When new versions of application agents and/or updates to application agents are available, the backup and restore application 120 can use the application data manager 122 to download, install and/or update the application agents.

The backup and restore application 120, such as Dell Technologies' PowerProtect Data Manager, can provide a virtual built-in storefront that enables a user to review the storefront's various application agents that a backup and restore application 120 has to offer. The user can make a selection, and the backup and restore application 120 can securely download the selected application agents from the backup and restore application 120, such as Dell Technologies' PowerProtect Data Manager, or from the vendor of the backup and restore application 120, such as Dell Technologies, push the downloaded application agents to the application hosts, and install the selected application agents.

Authenticated communications of application agents can be enabled by a certificate authority that issues a digital certificate which contains a public key and the identity of the public key's owner. The matching private key is not made available publicly but kept secret by the user who generated the key pair. Two types of authentication are provided for the application agent's software packages, root certificate authority authentication and vendor certificate authority authentication.

During a root certificate authority authentication, an application host downloads an application agent software package from the backup and restore application 120. The backup and restore application 120 can use a private key only known to the backup and restore application 120 to sign the application agent's software package. The application host uses the public key that corresponds to the private key that the backup and restore application 120 uses to authenticate the software package that includes an application agent. The root certificate authority authentication protects against a "man in the middle attack," in which a malicious user intercepts the application host's request for a public key and responds by providing the malicious user's public key.

However, the root certificate authority authentication cannot protect against a malicious user who gains unauthorized access into the framework for the provider of the backup and restore application 120, replaces the authentic application agent's software packages with their own malicious application agent software packages, and signs the malicious application agent software package with the private key of the backup and restore application 120. Therefore, the application host can download a certificate from the vendor of the backup and restore application 120, such as a Dell Technologies certificate from www.delltechnologies.com, and use the vendor's certificate to authenticate the application agent software package, which ensures the authenticity of the application agent software package that the application host just received. Therefore, the default authentication method prefers to use the vendor's certificate, and only uses the root certificate authority authentication if the vendor's certificate could not be obtained for any reason. The application host dynamically downloads certificates from the application or the application's web site to prevent malicious code from corrupting an application host's data center.

Each application host executes an application and has an agent software stack that includes agent services, add-ons, plug-ins, and application agents, such as application agents for Oracle, SQL, SAP HANA, Exchange, and/or File system. An application agent life cycle manager can download and install application agents in application hosts and register the installed application agents with the backup and restore application 120. After the backup and restore application 120 provides updates which have the most recent features, the application agent life cycle manager takes advantage of these most recent features by updating the application agents to become most recent versions that are available for the application agents.

The application data manager 122 can perform a precheck for each application host in a cluster of application hosts and/or for each standalone application host to determine which application hosts meet installation requirements for installing their application agents and/or for installing updates to their application agents. Examples of installation requirements include sufficient memory and/or sufficient disk space on an application host, and version compatibility. An example of version compatibility is illustrated by a software package that is configured to automatically update an application agent which is version 19.11 to become an application agent which is version 19.12, but is not configured to automatically update an application agent which is version 19.8 to become an application agent which is version 19.12 because the automated update features are not available for version 19.8. The application data manager 122 maintains consistencies in other ways, such as updating all application agents in an application host even if only one of the application agents in the cluster is requested to updated. Similarly, the application data manager 122 maintains consistencies by updating all application agents in an application host to the highest available version level even if only one of the application agents in the cluster is explicitly requested to be updated to the highest available version level.

Similar to the consistency maintained between application hosts in a cluster by installing an update in all of the application hosts in a cluster or in none of the application hosts in the cluster, the application data manager 122 will either put all the application hosts in a cluster into maintenance mode to facilitate the installation of updates, or if at least one of the application hosts fails to remain in maintenance mode, then the application data manager 122 will leave none of the application hosts in a cluster in maintenance mode. Likewise, the application data manager 122 will either process all the application hosts in a cluster as meeting installation or update requirements, or if a single application host in the cluster failed to meet the installation or update requirements, then the application data manager 122 will process none of the application hosts in a cluster as meeting installation or update requirements.

During a precheck for an application host, the application data manager 122 can identify a storage location in the application host to install a software package, which may include an application agent or an update to an application agent and download the software package which is subsequently installed in the identified storage location. Then the application data manager 122 can put the application host, which is in a cluster of application hosts or is a standalone application host, into a maintenance mode which temporarily prevents the application host from executing any new operations. When the application host has finished executing the last of any previous operations, the application data manager 122 can initiate an installation session to install each downloaded software package in each application host. Although this example describes the application data manager 122 performing a precheck or evaluating requirements right before the installation of a software package, the precheck can be performed separately from any software installation, such as around midnight on a Sunday when the system's traffic and/or load are low. In addition to executing prechecks at a time when system resources can be expended more efficiently, the application data manager 122 may ensure that the precheck is performed on an application host when the application host is not executing a backup operation or a restore operation.

Since application hosts may have many application agents that require updates from time to time, manually attempting to update each application agent could take hours. Therefore, application hosts can provide a service that accepts update commands, so that the application hosts can automatically update their application agents. Each application host can provide a set of representational state transfer (REST) application programming interface (API) services that authorized servers can call to update the application host's application agents.

These REST API services can include reporting the software version of an application host, reporting which application agents were updated and which application agents failed to be updated, pre-checking the version compatibility and installation/update requirements of an application host, downloading a software package to update an application agent in an application host, putting an application host into maintenance mode to prevent any new operations from being executed, installing a software package to update an application agent in an application host, and reporting on the results of an installation/update session for an application host/agent. The application host can dynamically update multiple application agents with application agent software packages while maintaining communication with the server for the backup and restore application 120. The update is agnostic to the type of application agent, and the unified API driven approach enables the updating of any type of application agent on multiple application hosts from a single pane of glass.

A rollback framework can preserve the initial state of each of multiple application agents before any attempted update of any of the application agents and return each application agent to its original state upon failure of any update for any of the application agents in a cluster of application hosts. The rollback framework can backup application agents and their state information before any attempted update of application agents in a cluster of application hosts. The rollback framework can also create new installation shell scripts and binary code that respond to the failure to update any application agent in a cluster of application hosts by rolling back the successfully updated application agents to their state before the attempted update of the application agents in the cluster of application hosts.

Due to the limitations of operating system packages' rollback capabilities, the rollback framework can extract content from error messages which provides information about failures to update one or more application agents in a cluster of application hosts, and use the content extracted from the error messages to writes shell scripts and/or binary code that can compensate for the limitations of operating system packages' rollback capabilities, thereby providing new rollback capabilities outside of the operating systems packages' rollback capabilities. Alternatively or additionally, the content extracted from error messages which provide information about failures to update any application agent in a cluster of application hosts may include suggested remedial action that the application data manager 122 can take to update the application agents that failed to be updated in a cluster of application hosts or can recommend actions that other entities take to update such application agents. Alternatively, agent services can extract content from error messages which provide information about failures to update any application agent in a cluster of application hosts, and use the content extracted from the error messages to attempt to recover from any failures to update, such as by following recommended actions.

A generic framework can backup application agents' configuration files as all components can provide a plug-in that can back up its own configuration files. These plug-ins can fit into the framework the agent service uses to back up all components' configuration files before initiating a software update. The agent service can back up any application agents' configuration files before each attempted update, which can be backed up through a component called an Add-on, such that each type of application agent has its own Add-on. The agent service can identify configuration files when calling into this Add-on, and the called Add-on can respond by backing up the configuration files. If an update of any application agent fails, then the Add-on can be used to restore any application agents' configuration files. Therefore, the framework can back up the unique configuration files of several different type of software components.

Before an update process begins, any application agent's service package can make a copy of its source files on an application host's hard drive, then launch a worker process from those source files. These source files' binary code is a full-fledged application agent's service package that can perform an update and continue reporting on the update process to the application host. Since the worker process is not part of any application agent's service package, the worker process is not affected by the update process and can continue reporting even if the update process fails. Any application agent's service package such as an update process can be executed by binary code, such as binary code named agentService. This binary code is not installed by an application agent software package.

Instead, this binary code can be created by copying the existing application agent service's binary code to a new name, such as agentSvcWorker. Then the application agent service's binary code can be updated, but the newly named agent, SvcWorker is untouched by the update process. After the update is completed, agentSvcWorker, can be removed. The application agent service package can stay up and active during the update process and can report failures and even try to recover from any failures of the update process. This solution enables binary code to be shipped in operating system packages and run outside of that framework during the update process.

When a user selects an application agent to be updated, the system's graphic user interface can call an API to check if the selected application agent is part of a cluster of application hosts. If the selected application agent is part of a cluster of application hosts, then the system's graphic user interface can check whether all the other application agents in the cluster of application hosts were also selected to be updated. If any of the application agents in the cluster of application hosts are not selected by the user for updating, the system's graphic user interface can provide an option to auto-select all the application agents in the cluster of application hosts, as well as the option to select all the application agents in any related clusters of application hosts. If a user selects either of these options, then all the application agents in the cluster of application hosts will be selected to be updated. If any of the application agents in the cluster of application hosts fails to be updated, then the backup and restore application 120, such as Dell Technologies' PowerProtect Data Manager 120, can retry to update the application agents in the cluster of application hosts that failed to be updated, and send a message to a system administrator which can suggest remedial action and/or identify the application agents in the cluster of application hosts that failed to be updated, even after any retries to update.

A system administrator can perform the suggested remedial actions on the application agents that failed to be updated, and then use a job grouping feature to group all the application agents in the cluster of application hosts together in one group, and to retry any updates at the group level. For cases when the suggested remedial action cannot help, a system administrator can use a new rollback option to roll back the updates that were successfully performed on any of the application agents in the cluster of application hosts, which can result in all of the application agents in the cluster of application hosts being in their original state before the attempted update, so that the application agents can continue creating backups until the challenge for the application agents that failed to be updated is subsequently resolved. If an installation session failed to install a downloaded software package for an application agent or an update in an application agent in an application host, then the application data manager 122 can retry the installation session that failed to install the application agent or the update in the application agent.

If a session for an installation or a retried installation fails to install an update for an application agent in an application host in a cluster of application hosts, then the application data manager 122 can provide a system administrator with the option to roll back the successful updates for instances of application agents in the cluster of application hosts to the previous conditions of these instances of application agents. The roll-back option exists because when any number of application hosts in a cluster of application hosts execute a higher version of an application agent than any number of other application hosts in the cluster are executing, the end-to-end operations of the backup and restore application 120 may not function correctly. For example, the application data manager 122 responds to a failed installation of an update in an application agent in the active application host in a high availability cluster of two application hosts by rolling back the successful installation of the update in the passive application host, which enables the high availability cluster to continue to function properly because all of its application hosts are executing the same version of the application agents.

In another example, a system administrator selected to update 128 application hosts that includes some standalone application hosts and some application hosts which are in clusters of application hosts. If only one attempted installation of an update fails, which is for one of the standalone application agents which is not in any cluster of application hosts, then the application data manager 122 responds by storing the 127 successfully updated application hosts to the primary storage 112 and sending a message about the one failed update to a system administrator. Alternatively, if only one attempt to install an update failed, which is for one of the application agents which is in a cluster of 16 application hosts, then the application data manager 122 responds by storing the other 112 successfully updated standalone application hosts to the primary storage 112, by rolling back the 15 successful installations of the update in the application hosts in the cluster which includes the application host that failed to install the update, and by sending a message to a system administrator about the failed attempt to install an update in the application agent.

Eventually, the application agent life cycle manager will unregister the application agents in the application hosts from the backup and restore application 120, and then decommission these application hosts from protection by the backup and restore application 120. The backup and restore application 120 provides a system administrator with the ability to enter a single click to remove an entire application host from the protection by the backup and restore application 120.

The backup and restore application 120 can record all assets as being soft deleted if the assets belong to a removed application host and were discovered by the backup and restore application 120. Any currently existing backup copies of these soft deleted assets can remain intact until the backup copies are subsequently expired and then deleted, such that a system administrator retains the ability to use these backup copies to perform a "restore to an alternate backup copies host." Garbage collection can collect these backup copies of assets only after all backup copies of the assets are subsequently expired and then deleted.

The backup and restore application 120 offers centralized application agent life cycle management, such that all application agents in a data center can be managed from a single pane of glass. The centralized application agent life cycle management provides the ability to perform automatic installation of application agents and/or updates to application agents on application hosts. The centralized application agent life cycle management also provides a centralized control to register all application agents with a backup and restore application 120, without requiring manual logins to each application host to perform the registration. The centralized application agent life cycle management further provides a centralized process to unregister application agents and decommission application hosts from the backup and restore application 120.

Although the following paragraphs describe a Dell Technologies' PowerProtect® Data Manager backup and restore application as an example of the backup and restore application 120, the backup and restore application 120 may be any other type of backup and restore application which provides the backup and restore functionalities described in the Background section. Even though the following paragraphs describe a Dell Corporation's Data Domain as an example of the backup server 110, the backup server 110 may be any other type of backup server which provides the backup and restore functionalities described in the Background section.

The backup and restore application 120 may be a Dell Technologies' PowerProtect® Data Manager backup and restore application, which supports Microsoft SQL/Exchange/DB2/Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides Information Technology with the necessary oversight and governance to ensure compliance, making even the strictest service level objectives obtainable.

The backup server 110 may be a Dell Technologies' Data Domain server. The Data Domain operating system delivers scalable, high-speed, and cloud-enabled protection storage for backup, archive, and disaster recovery. Data Domain employs variable-length deduplication to minimize disk requirements and to ensure data lands on a disk that is already deduplicated, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead.

Inline write and read verification protects against and automatically recovers from data integrity issues during data ingest and fetch. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares the read data to what was sent to disk, proving that it is reachable through the file system to disk and that the data is not corrupted.

Figure 2:
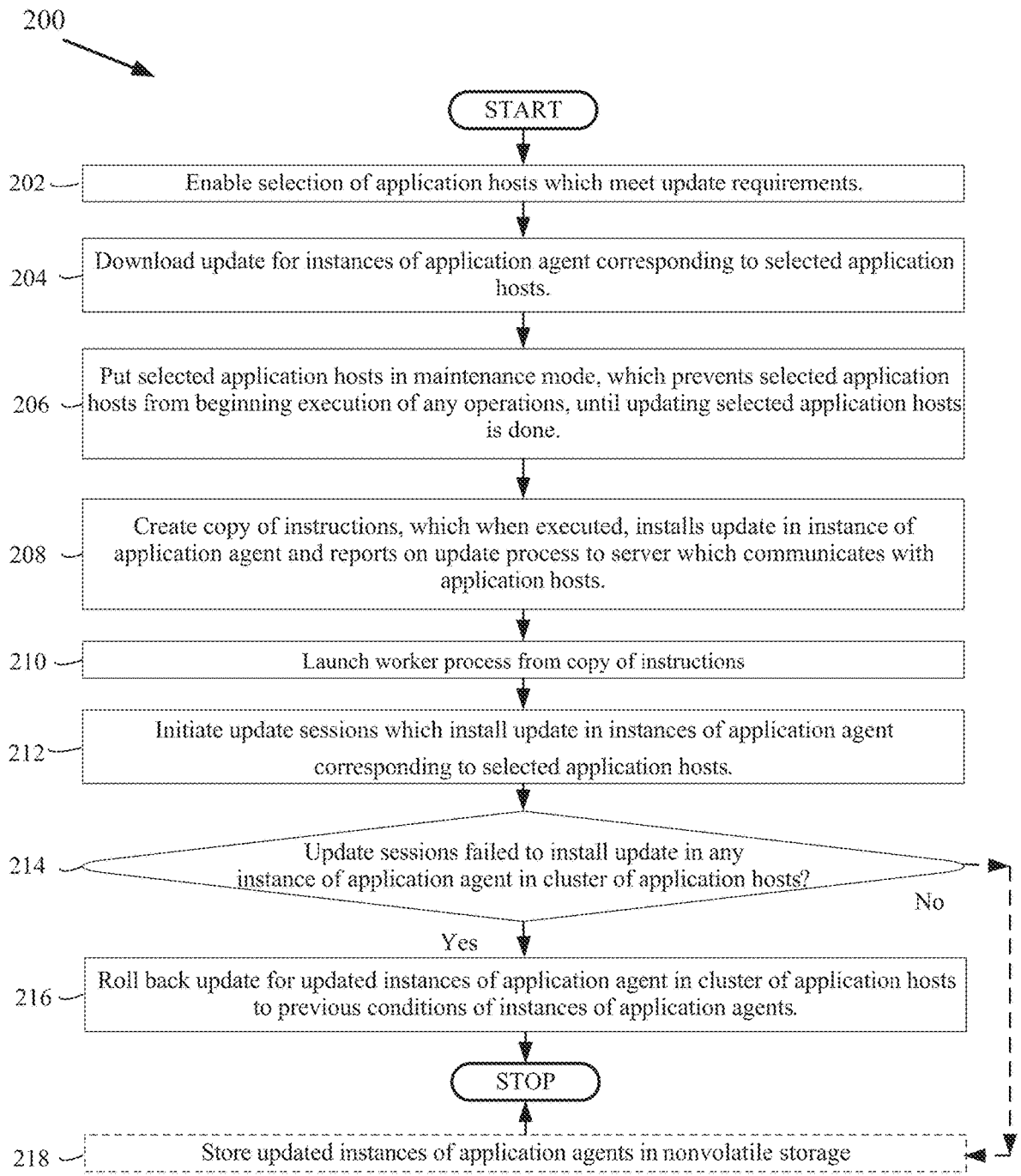
FIG. 2 is a flowchart that illustrates a method of launching copies of installation software that rolls back agent updates when cluster updates fail, under an embodiment.

FIG. 2 is a flowchart that illustrates a method for launching copies of installation software that rolls back agent updates when cluster updates fail, under an embodiment. Flowchart 200 illustrates method acts illustrated as flowchart blocks for certain steps involved in and/or between the clients 102-108 and/or the server 110.

A selection is enabled of application hosts which meet update requirements, block 202. The system enables a live user and/or an automated user to select application hosts for updating. For example, and without limitation, this can include the backup and restore application 120, which may be a Dell Technologies' PowerProtect® Data Manager 120, displaying application hosts, which include the application host 106 and the server 108 as some of the application hosts which the system administrator can select for updating. A selection can be the action of carefully choosing something as being the best or most suitable. An application host can be a computer that mediates multiple access and is designed to automate certain tasks, such as gathering information. An update requirement can be a pre-requisite that is needed to be in place at a location to enable a product to be made modern and/or more suitable.

After application hosts are selected, an update is downloaded for instances of an application agent corresponding to selected application hosts, block 204. The system downloads the updates for application agents which are executed by the application hosts that a user selected to update. By way of example and without limitation, this can include the application data manager 122 downloading updates, which include the update for the version 19.12 of the SQL agent 126 for the SQL application 124 in the application host 106, and the update for the version 19.12 of the Oracle agent 136 for the Oracle application 134 in the application host 106, because the system administrator selected to update the application host 106.

An update can be a revision that makes something modern and/or more suitable. An instance can be an example or a single occurrence of something. An application agent can be an entity that acts on behalf of a computer program designed to automate certain tasks, such as gathering information.

The update requirements may include sufficient memory and sufficient disk space for processing and storing an update. For example, the application data manager 122 determines that the application host 106 meets the memory and disk space requirements to process and install updates for the instances of the SQL agent 126 and the Oracle agent 136. Sufficient disk space can be implemented by a data storage device, such as a hard drive or a solid-state drive, which has enough capacity for storing a specific amount of data. Sufficient memory can be the electronic holding place for the instructions and data a computer needs to access quickly, and which is regarded as adequate for a specific task.

The update requirements can also include a version compatibility between a version of an update and a version of the instances of an application agent. For example, the SQL agent 126, which is version 19.11, is compatible with an update that modifies the SQL agent 126 to become version 19.12, but an SQL agent which is version 19.8 is not compatible with an automatic update which attempts to modify the SQL agent to become version 19.12 because the automated update features are not available for version 19.8. A version can be a particular release of a piece of computer software. Version compatibility can be the ability of a particular release of a piece of computer software to work with another particular release of a piece of computer software.

An update may be downloaded and/or installed either on demand and/or according to a schedule. For example, the PowerProtect® Data Manager 120 can provide a system administrator with an option to enroll in an automated update process which informs the system administrator in advance before any updates to the system administrator's application agents are released, and then schedules the automated download and installation of the updates to the instances of an application agent around midnight on a Sunday when the system's traffic and/or load drop below a corresponding threshold level. On-demand can be whenever required. A schedule can be the arrangement or the planning for an event to take place at a particular time.

Following an update being downloaded for the instances of the application agents in the selected application hosts, these selected application hosts are put in a maintenance mode, which prevents the selected application hosts from beginning execution of any operations, until the updating of the selected application hosts is completed, block 206. The system prevents the selected application hosts from beginning execution of any new operations, which thereby enables the application hosts to install updates. In embodiments, this can include the application data manager 122 putting application hosts, including the application host 106, in maintenance mode, which enables the application host 106 to install updates. A maintenance mode can be the condition for preserving something. An operation can be an action that is carried out to accomplish a given task.

Having put the selected application hosts into maintenance mode, a copy of instructions is created, which when executed, installs the update in an instance of an application agent in one of the application hosts and reports on the update process to a server which communicates with the application hosts; block 208. The system creates a copy of executable instructions which updates an agent and reports on the updating process. For example, and without limitation, this can include the SQL agent service 128 creating a copy of binary code, which when executed, installs the update in an instance of the SQL agent 126 in the application host 106, and reports on the update process to the backup server 110, which communicates with the application hosts, which includes the application host 106.

A copy can be a duplicate. An instruction can be a code or sequence in a computer program that defines an operation and puts it into effect. An update process can be the steps involved in the downloading and execution of a new version of software. A backup server can be a computer that executes computer programs which assist client devices in storing copies of data objects for retention within dedicated files.

One reason for creating an additional copy of a software package's executable instructions is because when such a software package automatically updates itself, the software package may overwrite itself during the updating process, and therefore terminate its own functioning. Consequently, such a self-updating software package needs another system component to continue the updating process and to report on the updating process. When such a self-updating software package attempts to use an operating system package, such as Windows MSI or Linux RPM, to continue and report on the updating process, the operating system package may update all the binary code in the software package by removing and replacing the old version of the binary code. Overwriting only the binary code during an update process can still cause the update process to terminate or cause a malfunction for the software package.

Some system administrators address this overwriting problem by launching an operating system installer on a remote host and then exiting. However, if the operating system installer fails, then the updating application host loses the ability to communicate with the remote host. Therefore, before an update process begins, an application agent's service package can make a copy of its source files on the application host's hard drive, then launch a worker process from those source files. These source files' binary code is a full-fledged application agent's service package that can perform an update and continue reporting on the update process, such as to the backup server. Since the worker process is not part of the application agent's service package, the worker process is not affected by the update process and can continue reporting even if the update process fails.

The application agent's update process can be executed by binary code, which may be referred to as agentService. This binary code is not installed by the application agent software package. Instead, this binary code can be created by copying the existing application agent service's binary code to a new name, such as agentSvcWorker.

Then the agent service's binary code can be updated, but the newly named agentSvcWorker, is untouched by the update process. After the update is completed, the agentSvcWorker can be removed. The agent service package can stay up and active during the update process and can report failures and even try to recover from the failures. This launching of copies of software enables binary code to be shipped in operating system packages and run outside of that framework during the update process. By copying the source files for an application agent's service package to an application host's hard drive, and launching a worker process from those source files, an application agent's service package can install an update and continue reporting on the update process to the central server which communicates with the application hosts.

After creating a copy of instructions that execute an update to an agent, a worker process is launched from the copy of the instructions, block 210. The system launches a worker process from a renamed copy of a software package which will not be effected by the self-updating feature of the original software package By way of example and without limitation, this can include the SQL agent service 128 launching a worker process from a copy of the agent service's binary code which is renamed agentSvc Worker, and therefore will remain unaffected when the copy of the software package updates the binary code of the original software package. A worker process can be a component that polls a task queue, dequeues a task, executes code in response to the task, and responds with the result.

After putting application hosts into maintenance mode, update sessions are initiated, which install an update in instances of an application agent corresponding to the selected application hosts, block 212. The system updates application agents in application hosts, thereby also updating the application hosts. In embodiments, this can include the application data manager 122 initiating update sessions that install updates, such as updates to the instances of the SQL agent 126 and updates to the instances of the Oracle agent 136, which modify these agents from their previous version number 19.11 to the most recent version number 19.12 that is available. An update session can be a time period devoted to a particular activity for making something more modern or more suitable.

The instances of an application agent are optionally updated and thereby become the most recent versions that are available of the instances of the application agent. For example, the instance of the SQL agent 126 which the application host 106 had been executing was version 19.11, and the updated instance of the SQL agent 126 which the application host 106 will be executing is the most recent version 19.12, whereas version 19.13 is not available for any users beyond a select few who are involved in beta testing. A most recent version can be the newest release of a piece of computer software.

Following the updating of instances of application agents in application hosts, a determination is made whether update sessions failed to install an update in any instance of an application agent in a cluster of application hosts, block 214. The system determines whether the update sessions installed an update in all of the agents in the cluster of hosts. For example, and without limitation, this can include the application data manager 122 determining whether the update sessions succeeded in installing an update in all of their intended application agents which are in their application hosts, including the updates to the SQL agent 126 and the Oracle agent 136 in the cluster which includes the application host 106. A cluster can be a set of computers that work together.

Determining whether the update sessions failed to install an update in any of the instances of an application agent in a cluster of application hosts can be further based on executing any suggested remedial actions and then retrying the group of update sessions that failed to install an update in any of the instances of an application agent in a cluster of application hosts.

For example, the application data manager 122 determines that the version 19.12 update was not initially installed in all of the instances in application hosts, such as the application host 106, so that the application data manager 122 executes a suggested remedial action, such as resetting an application host's network connections, and then retries the group of update sessions that had failed to install an update in any of the instances of an application agent in a cluster of application hosts, such as the application host 106. A suggested remedial action can be one or more tasks that are recommended to correct something that is wrong or to improve a bad situation. A group can be a number of things that are located together, considered together, or classified together.

If the update sessions failed to install an update in any instance of an application agent in a cluster of application hosts, then the method 200 continues to block 216 to roll back the updates in the application hosts to their previous conditions. If the update sessions installed an update in each instance of an application agent in a cluster of application hosts, then the method 200 proceeds to block 218 to store the updated instances of application agents for subsequent use.

If the update sessions failed to install an update in any instance of an application agent in a cluster of application hosts, an update is rolled back for the updated instances of an application agent in a cluster of application hosts to the previous conditions and configurations of the instances of the application agent, block 216. The system maintains consistency and functionality between application hosts by rolling back the updates from all successfully updated hosts in a cluster of hosts because the update failed for some of the other hosts in the cluster. By way of example and without limitation, this can include the application data manager 122 rolling back updates to successfully updated application agents, including the update in the SQL agent 126 because the application data manager 122 has failed to install the update in the Oracle agent 136.

An updated instance can be an example or single occurrence of something which is also modern or more suitable. A previous condition can be the particular state that something was in at a preceding time. A configuration can be the arrangement or set-up of the hardware and software that make up any part of a computer system. Then the method 200 terminates.

If the update sessions installed an update in each instance of an application agent in a cluster of application hosts, then the updated instances of the application agents are stored in non-volatile storage, block 218. The system retains application agents that have successfully updated if all of the application agents in the cluster of application hosts have been successfully updated. In embodiments, this can include the application data manager 122 storing to disk the successfully updated application agents, including the updated version 19.12 of the SQL agent 126 which protects the data for the SQL application 124 and the updated version 19.12 of the Oracle agent 136 which protects the data for the Oracle application 134. Non-volatile storage can be a broad collection of technologies and devices that do not require a continuous power supply to retain data or program code. Then the method 200 terminates.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

Figure 3:
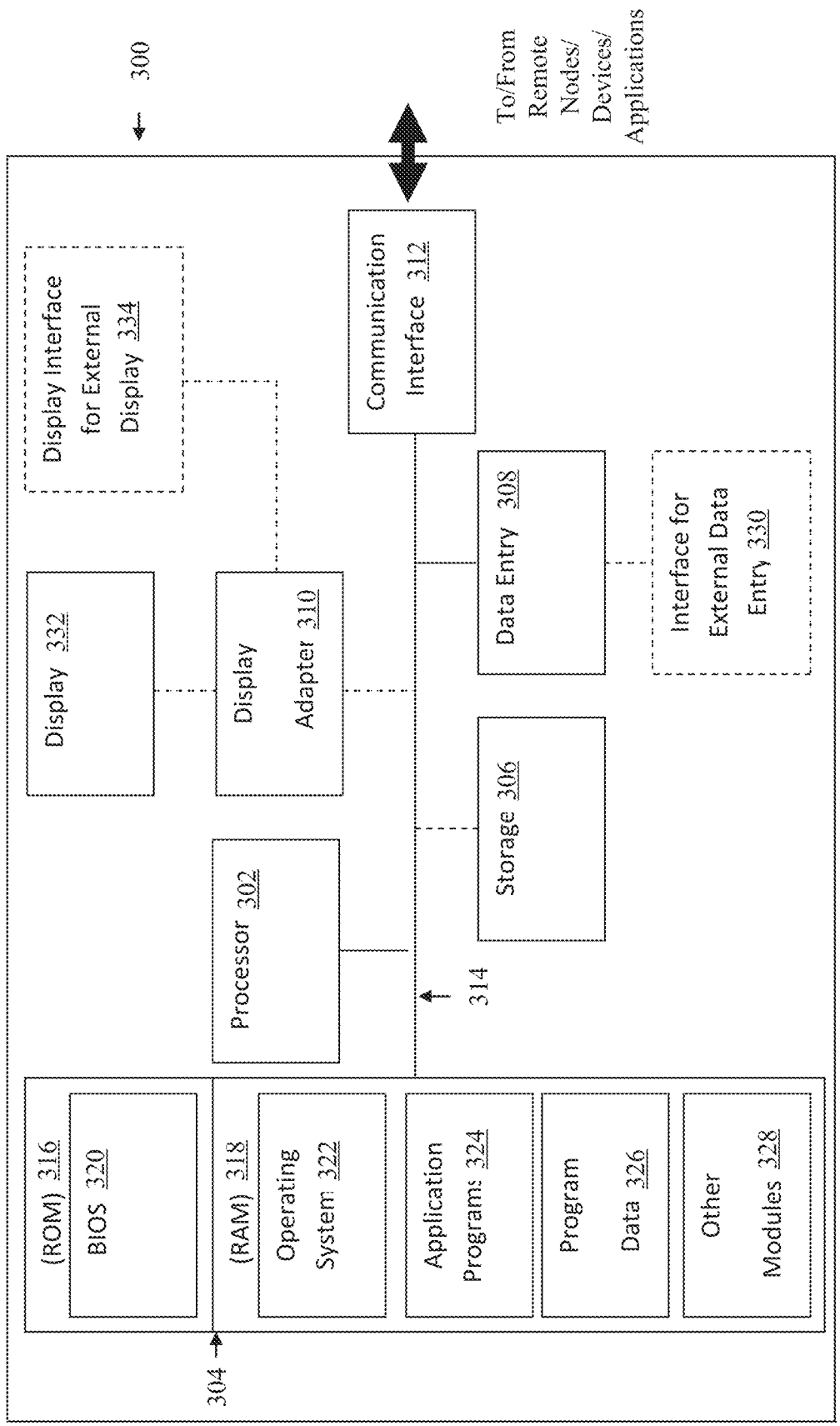
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random-access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 may also include non-volatile memory technologies such as non-volatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide non-volatile storage of computer readable instructions, data structures, program modules and other data for the hardware device 300. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc.

Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc.

The data entry module 308 may be configured to receive input from one or more users of the hardware device 300 and to deliver such input to the processing unit 302 and/or the memory 304 via the bus 314. A display 332 is also connected to the bus 314 via the display adapter 310. The display 332 may be configured to display output of the hardware device 300 to one or more users.

In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network.

Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for launching copies of installation software that rolls back agent updates when cluster updates fail, comprising:
    one or more processors; and
    a non-transitory computer-readable medium storing a plurality of instructions, which when executed, cause the one or more processors to:
        download an update for instances of an application agent corresponding to selected application hosts, in response to enabling a selection of application hosts which meet update requirements;
        put the selected application hosts in a maintenance mode, which prevents the selected application hosts from beginning execution of any operations, until updating the selected application hosts is completed;
        create a copy of instructions, which when executed, installs the update in an instance of the application agent in one of the selected application hosts and reports on the update installation to a server which communicates with the selected application hosts;
        launch a worker process from the copy of the instructions, wherein the worker process is unaffected when installing the update in the instances of the application agent corresponding to the selected application hosts;
        initiate update sessions which install the update in the instances of the application agent corresponding to the selected application hosts; and
        roll back the update for the updated instances of the application agent corresponding to the selected application hosts to previous conditions and configurations of the instances of the application agent, in response to a determination, by the worker process, that the update sessions failed to install the update in any of the instances of the application agent in a cluster of the selected application hosts.

2. The system of claim 1, wherein the update requirements comprise sufficient memory and sufficient disk space for processing and storing the update.

3. The system of claim 1, wherein the update requirements comprise version compatibility between a version of the update and a version of the instances of the application agent.

4. The system of claim 1, wherein the instances of the application agent that are updated become most recent versions that are available of the instances of the application agent.

5. The system of claim 1, wherein the plurality of instructions further cause the one or more processors to retry a group of update sessions that failed to install the update in any of the instances of the application agent in the cluster of the selected application hosts.

6. The system of claim 5, wherein retrying the group of the update sessions comprises executing any suggested remedial actions prior to retrying the group of the update sessions.

7. The system of claim 1, wherein the plurality of instructions further cause the one or more processors to store the updated instances of the application agent in a non-volatile storage, in response to a determination that the update sessions installed the update in all instances of the application agent in the cluster of the selected application hosts.

8. A computer-implemented method for launching copies of installation software that rolls back agent updates when cluster updates fail, the computer-implemented method comprising:

downloading an update for instances of an application agent corresponding to selected application hosts, in response to enabling a selection of application hosts which meet update requirements;

putting the selected application hosts in a maintenance mode, which prevents the selected application hosts from beginning execution of any operations, until updating the selected application hosts is completed;

creating a copy of instructions, which when executed, installs the update in an instance of the application agent in one of the selected application hosts and reports on the update process installation to a server which communicates with the selected application hosts;

launching a worker process from the copy of the instructions, wherein the worker process is unaffected when installing the update in the instances of the application agent corresponding to the selected application hosts;

initiating update sessions which install the update in the instances of the application agent corresponding to the selected application hosts; and rolling back the update for the updated instances of the application agent corresponding to the selected application hosts to previous conditions and configurations of the instances of the application agent, in response to a determination, by the worker process, that the update sessions failed to install the update in any of the instances of the application agent in a cluster of the selected application hosts.

9. The computer-implemented method of claim 8, wherein the update requirements comprise sufficient memory and sufficient disk space for processing and storing the update.

10. The computer-implemented method of claim 8, wherein the update requirements comprise version compatibility between a version of the update and a version of the instances of the application agent.

11. The computer-implemented method of claim 8, wherein the instances of the application agent that are updated become most recent versions that are available of the instances of the application agent.

12. The computer-implemented method of claim 8, further comprising retrying a group of update sessions that failed to install the update in any of the instances of the application agent in the cluster of the selected application hosts.

13. The computer-implemented method of claim 12, wherein retrying the group of the update sessions comprises executing any suggested remedial actions prior to retrying the group of the update sessions.

14. The computer-implemented method of claim 8, further comprising storing the updated instances of the application agent in a non-volatile storage, in response to a determination that the update sessions installed the update in all instances of the application agent in the cluster of the selected application hosts.

15. A computer program product comprising a non-transitory computer-readable medium having a computer-readable program code embodied therein to be executed by one or more processors, the computer-readable program code including instructions to:

download an update for instances of an application agent corresponding to selected application hosts, in response to enabling a selection of application hosts which meet update requirements;

put the selected application hosts in a maintenance mode, which prevents the selected application hosts from beginning execution of any operations, until updating the selected application hosts is completed;

create a copy of instructions, which when executed, installs the update in an instance of the application agent in one of the selected application hosts and reports on the update installation to a server which communicates with the selected application hosts;

launch a worker process from the copy of the instructions, wherein the worker process is unaffected when installing the update in the instances of the application agent corresponding to the selected application hosts;

initiate update sessions which install the update in the instances of the application agent corresponding to the selected application hosts; and roll back the update for the updated instances of the application agent corresponding to the selected application hosts to previous conditions and configurations of the instances of the application agent, in response to a determination, by the worker process, that the update sessions failed to install the update in any of the instances of the application agent in a cluster of the selected application hosts.

16. The computer program product of claim 15, wherein the update requirements comprise at least one of sufficient memory and sufficient disk space for processing and storing the update, or version compatibility between a version of the update and a version of the instances of the application agent.

17. The computer program product of claim 15, wherein the instances of the application agent that are updated become most recent versions that are available of the instances of the application agent.

18. The computer program product of claim 15, wherein the computer-readable program code includes further instructions to retry a group of update sessions that failed to install the update in any of the instances of the application agent in the cluster of the selected application hosts.

19. The computer program product of claim 18, wherein retrying the group of the update sessions comprises executing any suggested remedial actions prior to retrying the group of the update sessions.

20. The computer program product of claim 15, wherein the computer-readable program code includes further instructions to store the updated instances of the application agent in a non-volatile storage, in response to a determination that the update sessions installed the update in all instances of the application agent in the cluster of the selected application hosts.

* * * * *